Sept. 13, 1966  G. P. McGRAW, JR  3,273,034
EXTENDED FOIL CAPACITOR WITH DISC-LIKE
TERMINALS CENTRALLY ANCHORED THERETO
AND A METHOD OF MAKING THE SAME
Filed Feb. 24, 1965
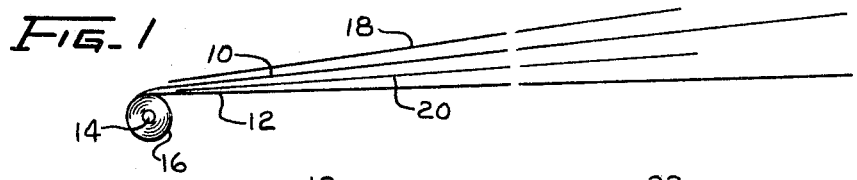
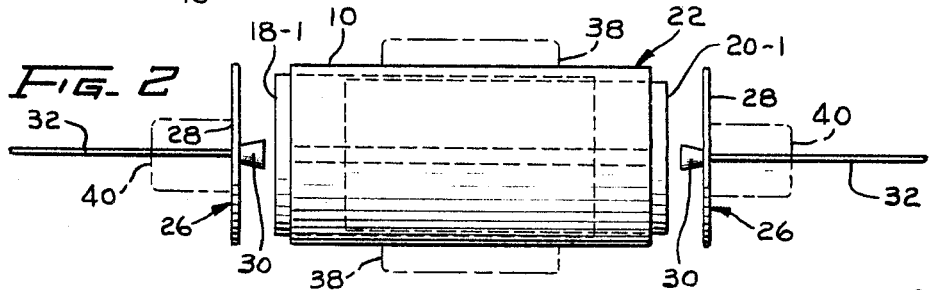
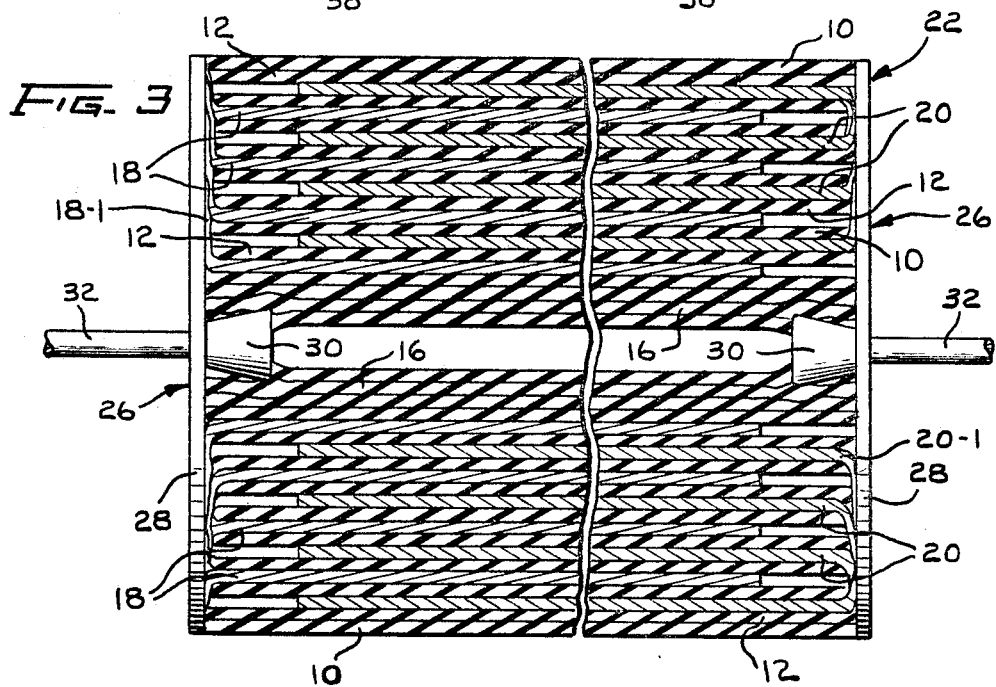
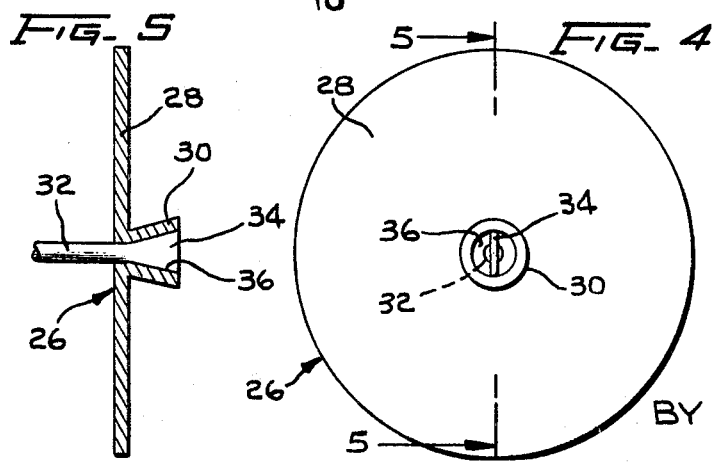
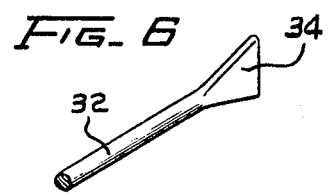
INVENTOR
G. P. McGRAW, JR
BY A. C. Schwey, Jr.
ATTORNEY

United States Patent Office 3,273,034
Patented Sept. 13, 1966

3,273,034
EXTENDED FOIL CAPACITOR WITH DISC-LIKE TERMINALS CENTRALLY ANCHORED THERETO AND A METHOD OF MAKING THE SAME
George P. McGraw, Jr., Downers Grove, Ill., assignor to Western Electric Company, Incorporated, New York, N.Y., a corporation of New York
Filed Feb. 24, 1965, Ser. No. 435,093
5 Claims. (Cl. 317—260)

This invention relates to extended foil capacitors and methods of making the same, and more particularly to extended foil capacitors having disc-like terminals securely anchored to the capacitor, and methods of fabricating them.

Objects of the invention are to provide an improved extended foil capacitor and a method of making it.

Other objects of the invention are to provide an improved extended foil capacitor and terminals therefor and a method of bonding the terminals to the foil electrodes and of anchoring them to the capacitor.

A capacitor and a method of making it illustrating certain aspects of the invention may include the winding of a portion of a pair of superposed thermoplastic dielectric webs on an arbor to form a dielectric core and winding additional portions of the webs with a pair of interleaved foils of tin alloy to form a capacitor roll with the foils supported in insulated, superposed and partially overlapping relation to each other and with a marginal portion of the foils individually extending beyond the other foil and beyond the dielectric webs at opposite ends of the capacitor roll.

Terminals are provided for the capacitor roll, each terminal having a disc portion with a centrally disposed flared hub on one side thereof and a terminal lead extending centrally from the opposite side thereof. The terminals are heated and moved axially against the end of the capacitor roll to effect (1) the compression of the extended portions of the foils against the webs, the melting of portions of the foils and the bonding of the disc portions of the terminals thereto, resulting in the hermetic sealing of the ends of the capacitor body, and (2) the movement of the heated flared hub portions into the ends of the dielectric cores and the melting of portions of the core, resulting in the embedding of the flared hubs therein and the securement of the hubs and the terminals to the capacitor roll upon the cooling of the terminals and the core.

Other objects, advantages and novel aspects of the invention will become apparent upon consideration of the following detailed description, in conjunction with the accompanying drawing, in which:

FIG. 1 is a diagrammatic elevational view showing the winding of a pair of dielectric webs and a pair of metal foils onto an arbor to form a capacitor roll;

FIG. 2 is an enlarged side elevational view of the capacitor roll with a pair of terminals aligned with the capacitor roll and spaced from the ends thereof;

FIG. 3 is an enlarged fragmentary longitudinal sectional view of the capacitor with the terminals attached thereto;

FIG. 4 is an end view of one of the terminals;

FIG. 5 is a fragmentary sectional view of the terminal taken along the line 5—5 of FIG. 4; and FIG. 6 is a perspective view of a portion of a terminal lead.

Referring to the drawings, a predetermined length of the leading end portions of a pair of dielectric webs 10 and 12 of thermoplastic material are wound onto an arbor 14 to form a cylindrical core 16 having a substantial wall thickness of a predetermined dimension. The superposed webs 10 and 12 are coextensive in width.

After a predetermined number of convolutions of the webs have been wound onto the arbor to form the core 16, a pair of electrode-forming foils 18 and 20 of tin alloy are interleaved with the webs and are wound therewith onto the core 16 to form a capacitor roll 22 (FIG. 2). The foils 18 and 20, which are of the same width, are disposed in partially overlapping relation to each other and to the webs with a marginal portion of each of the foils displaced beyond the other foil and with a marginal portion 18-1, 20-1 (FIG. 2) of lesser extent of the foils extending beyond the longitudinal edges of the webs 10 and 12 and disposed at opposite ends of the capacitor roll. After predetermined lengths of the foils have been wound onto the core and severed from the supplies thereof, additional lengths of the webs are wound around the capacitor roll, sealed thereto, and severed from the supplies thereof.

Terminals 26 are provided for the foil electrodes. Each of the terminals is formed with a flat metal disc 28, for contacting the extended foil at one end of the capacitor roll, and a flared hub 30 which extends centrally from one side of the disc and has an enlarged outer end and a reduced neck for engaging the end portion of the dielectric core 16 and effecting an anchoring connection therewith. The terminal 26 also includes a wire lead 32 extending from the opposite side of the disc 28. At one end thereof the wire lead 32 is shaped to provide a flat flared head 34 (FIG. 6) which in outline conforms to and is pressed within the flared aperture 36 in the hub 30 on the terminal disc 28 to form a unitary terminal. The terminal disc 28 and lead 32 are tin coated to secure more firmly the lead to the disc and to facilitate the soldering of the terminal to the foil electrodes.

In assembling the terminals 26 to the capacitor roll 22 the latter is supported in a suitable holder 38 shown diagrammatically in dotted lines in FIG. 2, and the terminals 26 are suitably supported in holders 40 at opposite ends of and in coaxial alignment with the capacitor roll 22. The terminals 26 are electrically heated to a soldering temperature through the holders 40 by suitable means (not shown) for a predetermined length of time and the holders 40 are moved axially toward the capacitor roll. This causes (1) the heated disc portion 28 of the terminals 26 to compress the extended foil against the edges of the dielectric webs and form a compacted layer of foil at each end of the capacitor roll, and to melt portions of the compacted layer of the foil and become bonded thereto, and (2) the heated hub 30 to engage and melt a portion of the thermoplastic core 16 and cause a portion of the melted core to flow around the hub and effect the embedding of the hub in the end portion of the core upon the cooling of the terminal and the core. This results in a strong mechanical attachment of the terminal 26 to the capacitor roll 22, provides a good soldering connection between the terminal discs and the entire length of the foil electrodes, and effects a hermetic sealing at the ends of the capacitor body.

Instead of winding the leading ends of the webs 10 and 12 to form the core 16, a separate tubular core of thermoplastic dielectric may be provided on which to wind the interleaved electrode foils and dielectric webs and into which the flared hubs of the terminals may be embedded.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:
1. A capacitor comprising:
    a pair of foils of tin alloy and a pair of thermoplastic dielectric webs convolutely arranged in a roll with the foils interleaved with and supported by the dielectric webs in insulated, superposed and in partially overlapping relation to one another and with a marginal portion of one of the foils extending beyond and compressed against the dielectric webs at one end of the capacitor roll, and with a marginal portion of the other foil extending beyond and compressed against the dielectric webs at the other end of the capacitor roll, and with the leading end portions of said dielectric webs extending beyond the leading ends of the foils and forming a tubular core; and terminals for the foils, each terminal comprising a flat disc portion bonded to the compressed marginal portion of the foil along the entire length thereof at one end of the capacitor roll, and a hub portion with a reduced neck and an enlarged end of greater diameter than the bore of said tubular core extending centrally from one side of said disc portion and embedded in and anchored to an end portion of said core.

2. A capacitor comprising:
a tubular core of thermoplastic dielectric material;
a pair of thermoplastic dielectric webs having a width coextensive with said tubular core;
a pair of foils of tin alloy interleaved with the webs and supported therewith on the core in a spiral configuration to form a roll with the foils in insulated, superposed, and partially overlapping relation to one another and with a marginal portion of one of the foils extending beyond and compressed against the dielectric webs at one end of the roll and with a marginal portion of the other foil extending beyond and compressed against the dielectric webs at the other end of the capacitor roll; and
terminals at the ends of the capacitor roll, each of said terminals comprising a flat disc portion bonded to the compressed marginal portion of the foil along the entire length thereof at one end of the capacitor and provided with a flared hub extending centrally from one side of the disc portion embedded in and anchored to the end portion of said core.

3. A capacitor as defined in claim 2 wherein said terminal is provided with a central aperture in said disc portion and said hub thereof and has a headed wire lead secured thereto in the aperture thereof and extending therefrom.

4. A method of making a capacitor which comprises:
forming a tubular thermoplastic dielectric core;
winding a pair of dielectric webs having a width coextensive with the core, and a pair of foils of tin alloy around the core to form a capacitor roll with the foils supported by the webs in insulated, superposed and partially overlapping relation to each other and with a marginal portion of one of the foils extending beyond the core and the webs at one end of the capacitor roll and with the marginal portion of the other foil extending beyond the core and the webs at the other end of the roll;
forming a terminal having a flat disc portion with a central flared hub extending from one side thereof;
heating a pair of such terminals to a temperature sufficient to melt the foils and the thermoplastic core; and
compressing the extended portions of the foils against the webs at the ends of the capacitor roll with the heated terminals and bonding the flat disc portions of the terminals to the marginal portions of the foils along the entire length thereof, and simultaneously therewith, embedding the hubs of the terminals in the ends of the core.

5. A method of making a capacitor which comprises:
winding a portion of a pair of superposed thermoplastic dielectric webs to form a dielectric core;
winding a pair of foils of tin alloy and additional portions of the webs onto the core to form a roll with the foils supported by the webs in insulated, superposed and partially overlapping relation to each other and with a marginal portion of one of the foils extending beyond the dielectric webs at one end of the roll and with the marginal portion of the other foil extending beyond the dielectric webs at the other end of the roll;
forming a terminal having a flat disc portion with a flared hub extending centrally from one side thereof;
heating a pair of such terminals to a temperature sufficient to melt the foils and the thermoplastic core; and
compressing the extended portions of the foils against the webs at the ends of the capacitor roll with the heated terminals and bonding the flat disc portions of the terminals to the marginal portions of the foils along the entire length thereof, and simultaneously therewith, embedding the hubs of the terminals in the ends of the core.

References Cited by the Examiner

UNITED STATES PATENTS

| 1,990,819 | 2/1935 | Danziger | 317—260 |
| 2,627,645 | 2/1953 | Harris | 29—25.42 |
| 2,915,808 | 12/1959 | Clemons | 29—25.42 |
| 3,014,167 | 12/1961 | Winter | 317—260 |
| 3,090,895 | 4/1963 | Hall | 317—260 |
| 3,100,857 | 8/1963 | Rice | 317—260 |
| 3,134,059 | 4/1964 | Rayburn | 317—260 |

FOREIGN PATENTS

| 869,511 | 3/1953 | Germany. |
| 235,769 | 6/1925 | Great Britain. |
| 487,967 | 12/1953 | Italy. |

LEWIS H. MYERS, *Primary Examiner.*

ROBERT K. SCHAEFER, *Examiner.*

E. GOLDBERG, *Assistant Examiner.*